Patented Apr. 14, 1936

2,037,600

UNITED STATES PATENT OFFICE 2,037,600

METHOD OF MAKING CHROMITE REFRACTORIES

Gilbert E. Seil, Cynwyd, Pa., assignor to E. J. Lavino and Company, Philadelphia, Pa., a corporation of Delaware No Drawing. Original application October 28, 1932, Serial No. 640,099. Divided and this application December 5, 1935, Serial No. 53,076

18 Claims. (Cl. 25—156)

My invention relates to a novel method of making refractory material, and more particularly it relates to a method of producing a chromite refractory of improved physical and chemical characteristics. This application is a division of my co-pending application Serial No. 640,099 which has become Patent 2,028,018 filed October 28, 1932.

The principal object of the present invention is to provide a chromite refractory in which the physical and chemical properties are improved in a marked manner and in which the disadvantages accompanying chromite refractories heretofore manufactured have been overcome.

One of the objects of my invention is to provide a method for manufacturing a chromite refractory whose softening point is materially higher than that of similar refractories of the prior art, with the accompanying result that the refractory will not deform at any usual furnace temperatures or under any furnace conditions encountered in the use of the product regardless of the severity thereof.

A further object of the invention is to provide a method by which a chromite refractory material with a minimum tendency to spall and with a very low thermal conductivity and a low coefficient of expansion may be manufactured.

Still another object of my invention is to furnish a method for the production of a chromite refractory which is neutral chemically and in which the bond is much less active from a chemical standpoint than heretofore, whereby the slagging action is much less and a higher temperature can be employed before reaction starts.

Other objects will be apparent from the consideration of the specification and claims.

The present invention in its preferable form contemplates the combination in a chromite refractory of a stabilized chrome ore and dead burnt crystallized magnesium oxide, for example, periclase, in such proportion that the low melting point gangue of the chrome ore, comprising magnesium silicates of a lower average magnesium oxide content than forsterite, is converted by the magnesium oxide into magnesium silicate of high melting point, known as "forsterite". Hereinafter the term "periclase" will be used throughout, and it is to be understood that within that term is included magnesium oxide having the physical characteristics of periclase regardless of its technical name or source.

The combination between the chrome ore and the periclase may be brought about by at least three methods:

I. The periclase addition may be made to raw chrome ore and the two materials may be subjected to the preliminary stabilizing heat treatment;

II. A portion of the periclase may be added to the raw chrome ore and the two materials may be subjected to the preliminary stabilizing heat treatment, and the remainder of the periclase may then be added to the ground heat-treated ore in the tempering operation; and III. All of the periclase may be added to the heat-treated stabilized chrome ore during the tempering operation.

Regardless of the particular process, the final product will contain forsterite as a thin film surrounding the particles of chromite.

In my co-pending application, Serial No. 540,495, filed May 27, 1931, which has become Patent No. 2,028,017, entitled "Chromite material and method of making the same", of which the present application is a continuation in part, there is described the stabilization of raw chrome ore by the heat treatment thereof. As there pointed out, raw chrome ore contains many impurities which together with the chromite, unless the chrome ore is stabilized, undergo reactions and molecular rearrangements and physical changes during the burning of the preformed bricks or other shaped articles. The results obtained in the manufacture of chromite refractories from raw chrome ore, therefore, are fortuitous, shrinkage often occurring during the burning which results in deformation of the products and fractures thereof.

This is also evidenced by changes in the physical constants of the material, for example, in changes in the specific gravity and specific heat. It is, therefore, desirable preliminarily to heat-treat the chrome ore so that the constituents will be in the physical and chemical condition found at the burning temperature, thus precluding physical and chemical rearrangements during burning which cause deformation and fractures. The heat treatment also results in a very definite migration of the gangue materials, and after such treatment the gangue will be found surrounding the surfaces of the particles of chromite. The stabilization temperature should not be less than the temperature to which the preformed refractory body is subjected in burning, for example, 3,000 degrees F. to 3,400 degrees F., depending on the ore being treated. The heat treatment is continued until the desired rearrangements, such as the recrystallization of the chromite spinel and the redistribution of the gangue minerals, have taken place.

In the manufacture of the refractories of the present invention it is also advisable to subject the raw chrome ore to a similar stabilizing heat treatment prior to the tempering, pressing and burning operations. This stabilization process removes the shrinkage from the material, and thus eliminates from the process the difficulties encountered in the use of raw ore and reduces to a minimum the number of rejects. The preliminary heat treatment also presents the gangue for reaction with the periclase in the most available condition, whether the periclase is added before the heat treatment, or during the tempering operation. If for the sake of economy, or for other reasons, it is desired to employ crude chrome ore without prestabilization or heat-treatment, the raw untreated ore may be used and the process carried on in the manner hereinafter described. The properties of the product will be more difficult to control and the process will not result in as high a yield of satisfactory usable products. It is for these reasons that the prestabilization of the ore is recommended.

Raw chrome ore is a two-component system from a refractory standpoint. The first component comprises 70% to 90% of chromite known as chromite spinel, which is a mineral, the basic radicles are FeO and MgO in varying amounts, but the sum of which bears a constant molecular relationship to the sum of the acid radicles $Cr_2O_3$ and $Al_2O_3$. The second component known as gangue consists of MgO and $SiO_2$ which are chemically combined as one of the magnesium silicates, but are combined in varying proportions molecularly. The lowest magnesium silicate is $(MgO)_2.(SiO_2)_3$; while the highest one that normally occurs associated with the chrome ore is $MgO.SiO_2$. This second component is rarely pure and contains as impurities $Fe_2O_3$, CaO, $Al_2O_3$, $SiO_2$, etc. The melting point of these gangue materials is from 2,500 degrees F. to 2,600 degrees, F., depending upon the ratio of MgO to $SiO_2$ and the percentage of impurities present. The present invention contemplates the addition of periclase to the chrome ore, whereby a reaction is brought about between the periclase and the magnesium silicates, with the result that the low melting point magnesium silicates are converted into a refractory body of high melting point, known as forsterite, whose formula is $(MgO)_2.SiO_2$. The melting point of the forsterite is approximately 3,500 degrees F. in a pure state, but in the presence of an excess of magnesium oxide, the fusion of the compound is not complete at 3,700 degrees F. Both the temperatures of 3,500 and 3,700 degrees F. are in excess of those encountered in the use of the refractory materials. As previously stated by the term "periclase" is included any dead burnt crystallized magnesium oxide, and for practical purposes, commercial periclase containing from 90% to 93% magnesium oxide is employed. The magnesium oxide employed, must be a dead burnt material, for otherwise hydrolysis occurs which causes an increase in the volume of the brick and also results in the liberation of steam at a high rate, due to the fact that the magnesium oxide resulting from the hydrolysis decomposes at a definite temperature. The liberation of the steam creates a pressure within the preformed body, which causes its fracture. The use of dead burnt magnesium oxide in crystalline form presents none of the stated difficulties, since the hydrolysis of this type of compound takes place at a very slow rate.

The amount of dead burnt magnesium oxide (periclase) employed is determined by chemical and petrographic analyses of the ore. In other words, it is desirable not only to determine the amount of MgO and $SiO_2$ chemically, but also to ascertain the type of gangue petrographically so that the distribution of the MgO and $SiO_2$ in the ore and the molecular ratios of magnesium oxide to silicon dioxide combined in the magnesium silicates may be known. The amount of periclase added in the preferable instance is dependent upon the amount required to convert the magnesium silicates and free silica found to be present in the ore to forsterite, without decomposition of the chromite spinel of the ore, and in general, in order to obtain the best results an excess of periclase over that required is employed in order to insure that after the reaction no free $SiO_2$ and no low melting point magnesium silicates will exist in the refractory. The low efficiency of mechanical mixing employed to bring the periclase and chemical ore into contact accounts for the advisability of adding the excess periclase. If periclase in amounts greater than 12½% is employed even though the addition is not sufficient to convert all of the magnesium silicates present in the ore into forsterite, a refractory material of improved properties as compared to prior products is obtained, the improved properties being proportional to the amount of forsterite formed. In most instances the proportion added will be between 17% and 25% of the weight of the chrome ore, and while the upper limit of periclase addition is not critical and considerable excess can be added without detriment, it must not be added in such amount as will result in the formation of appreciable quantity of water-soluble magnesium chromate. The presence of magnesium chromate in the refractory is a direct indication of the upper limit of periclase addition which is permissible.

The raw mix of treated chrome ore and periclase, regardless of which of the three methods previously outlined are employed in its preparation, is screened to suitable size and is tempered according to any well known method in the presence of plasticizers and binders, if desired. The tempered material then is pressed, for example, either in a lever or an hydraulic press, as has previously been employed in the manufacture of similar refractories. The pressure in the press may vary widely, for instance, a pressure of 600 pounds per square inch, or higher, may be employed, depending upon the shape, size and porosity required. The refractory is burned by any known method, for example, in a tunnel kiln with a controlled time and temperature curve, both for heating and cooling. The burning temperature is preferably higher than that employed in the manufacture of the usual chromite refractories, and in fact a burning temperature of about 3,000 degrees F. which corresponds to cone 28 completely down is particularly suitable.

In a typical case, crude chrome ore is employed whose primary mineral is chromite and whose secondary mineral is one or more of the members of the serpentine family, and whose chemical analysis is as follows:

| | |
|---|---|
| $Cr_2O_3$ | 42.0% to 45.0% |
| $SiO_2$ | 9.5% to 10.00% |
| FeO | 13.0% to 16.0% |
| $Al_2O_3$ | 11.0% to 14.0% |
| CaO | 1.0% or less |
| MgO | 12.0% to 15.0% |

It will be noted that the ore contains approximately 10% of silica, and in order to determine the amount of periclase to be added, if only approximate figures are desired, it may be assumed that the given amount of silica will require magnesium oxide in the ratio of two parts of magnesium oxide to one part of silica to form forsterite ($(MgO)_2.SiO_2$). A calculation taking into consideration the molecular weights of the compounds, therefore, shows that approximately thirteen parts of magnesium oxide are required. However, as previously pointed out, it is desirable to employ an excess of magnesium oxide in order to insure that all of the silica either free or combined as magnesium silicate will be converted into forsterite, and experiments have shown that with an ore of the above analysis 22½% of periclase containing 92% of magnesium oxide gives the best results.

If Method I is to be employed in which all the periclase is added to the untreated ore and the mixture subjected to the heat treatment employed to stabilize the ore, 77½% by weight of raw ore is mixed with 22½% of periclase in a finely divided condition. Briquets are then made by homogeneously and intimately mixing the particles and the mass is pressed. The briquets are then subjected to the stabilizing heat-treatment process, preferably by being passed through a rotary kiln at 3,000° F. to 3,500° F., and more specifically at temperatures between 3,200° F. and 3,400° F. The best results are obtained by increasing the temperature very quickly from just below the melting point of the lowest melting point magnesium silicate up to the desired temperature, say 3,200° F., in order to get a very mobile liquid to react with the periclase. The time required varies inversely with the temperature, and the briquets are subjected to the stabilization temperature for a sufficient time to convert the magnesium silicates and silica into forsterite and to allow the chemical and molecular changes and rearrangements to take place in the chrome ore. The resulting product is a two-component body, both components of which have a high melting point, and a microscopic examination shows that the periclase is found in a thin film surrounding the chromite particles.

After the heat treatment, two separate grinds are prepared which will be termed herein "Grind A" and "Grind B". The screens hereinafter discussed are all of the dimensions adopted by the Bureau of Standards. Grind A is a so-called rolled product and is sized with one screen, everything that passes through a 6 mesh screen being employed. A screen analysis shows that of the material that passes through the 6 mesh screen, not less than 85% are caught on a 40 mesh screen, the remainder passing through. The particles are flat faced, sharp, and pointed, and are of three approximately equal dimensions, without rounded corners. Grind B is a pulverized material made in a rubbing mill which results in round cornered particles of nearly spherical shape. All of the particles pass through a 20 mesh screen and at least 50% pass through a 200 mesh screen, although in the most preferred case, 70% passes through said screen. 77½ parts of Grind A by weight and 22½ parts of Grind B by weight are placed in a tempering pan to which is added .1% of goulac, .25% of boiled starch prepared by adding borax to starch and subsequently heating the mixture, and 2% of an oil such as fuel oil. Water is added to the mixture in proportions sufficient to give the necessary plasticity to the mass during the pressing operation. For example, the moisture content may be brought up by the addition of water to about 4% of the weight of the ore. The material is treated in the tempering pan until it is uniformly mixed, which usually requires only five or ten minutes. It is desirable to treat the material in the pan so that it is not further ground and the stirring device may be rubber-covered and of relatively light weight to insure this. There must, however, be interstitial flow between the particles so that a homogeneous mix is obtained. After the tempering, the mass is pressed to the desired shape, size, and porosity in any desired manner, such as in a lever or hydraulic press with a pressure of 600 pounds per square inch or higher, depending upon the size, shape, and porosity required. The burning is accomplished by any known method, for example, by passing the shaped material through a tunnel kiln with a controlled time and temperature curve both for heating and cooling. Preferably a ninety hour cycle is used through the tunnel which may be 327 feet long of which 85 feet in the center is the actual fire zone. The temperature of the furnace at the beginning of the fire zone is in the neighborhood of 2,200° F. and reaches its peak at 3,000° F. or higher. The material remains in the fire zone for approximately twenty-four hours.

If Method II is to be employed, the desired amount of periclase is added to the raw crude ore, for example 10%, and the mixture is subjected to the stabilizing heat-treatment as set forth above under the discussion of Method I. After the stabilization step, the remaining periclase necessary to make up the total amount required is ground with sufficient heat-treated ore to make up 22½% of the total mix in such a manner as to give a grind of the characteristic of Grind B. 77½ parts of Grind A made up of treated ore and the 22½ parts of Grind B are added to the tempering pan. The process of making the refractory material thereafter may be carried out in the same manner as described in connection with Method I.

If Method III is to be employed, the crude ore is subjected to the stabilizing heat-treatment as previously described without the addition of any periclase and is ground after such treatment in the form of Grind A. The periclase is ground to constitute Grind B, and 77½ parts of Grind A and 22½ parts of Grind B are added to the tempering pan and the process is thereafter carried out in the same manner as previously described.

In all of these methods, the low melting point gangue has been converted into a refractory material, forsterite, which is spread as a thin film over the chromite particles. The stabilizing heat-treatment distributes the gangue through the mass of ore so that it can be reacted upon by the periclase whether that compound is added during or after the heat-treatment. The distribution is such that the reaction can be carried out during the burning as in Methods II and III without any physical distortion or disturbance.

Chromite refractories previously manufactured have a softening point between 2,300° F. and 2,600° F. and deform at these temperatures under a load of 25 pounds per square inch. They also shrink very badly at 2,600° F. and sag under their own weight at this temperature. If submitted to a spalling test, a high spalling loss will be encountered. The bond is also active chemically and slagging tends to occur at the temperatures employed in the furnaces. In contradistinction to these properties, the chromite brick of the present invention does not soften at 3,500° F. and, therefore, does not deform or sag at any furnace temperature or under any furnace conditions under 3,500° F. or higher. The brick has a minimum tendency to spall and the bond is practically inactive chemically and, therefore, no difficulty is encountered with slagging, it being possible to carry the refractory to much higher temperatures than previously before reaction starts. The new brick is neutral chemically and has a very low thermal conductivity and a low coefficient of expansion. The low thermal conductivity is evidenced by the fact that nine inches of the refractory of the present invention will allow less heat to pass than eighteen inches of a silica refractory.

Considerable modification is possible in the percentage of dead burnt magnesium oxide added, as well as in the methods employed in stabilizing the crude chrome ore and in the manufacture of the refractory body, without departing from the essential features of the present invention.

I claim:

1. The process of making a chromite refractory from natural chrome ore which comprises grinding chrome ore to produce relatively coarse granules; treating dead burnt crystallized magnesium oxide to convert it to finely divided form; and mixing the relatively coarse ground chrome ore with said finely divided magnesium oxide in an amount greater than 12½% of the total weight of the mix but insufficient to decompose the chromite spinel of the ore and thereby forming a refractory composition characterized, after firing, by a substantially higher softening point than a similar refractory not treated with said magnesium oxide.

2. The process of making a burned chromite refractory from natural chrome ore characterized by the presence therein of forsterite, which comprises grinding chrome ore to produce relatively course granules; treating dead burnt crystallized magnesium oxide to convert it to finely divided form; mixing the relatively coarse ground chrome ore with said finely divided magnesium oxide in an amount greater than 12½% of the total weight of the mix but insufficient to decompose the chromite spinel of the ore; tempering; shaping; and thereafter burning the shaped mass.

3. The process of making a burned chromite refractory material from natural chrome ore, characterized by the presence therein of forsterite, which comprises associating in intimate admixture chrome ore and dead burnt crystallized magnesium oxide, the magnesium oxide being present in amounts greater than 12½% of the total weight of the mix but insufficient to decompose the chromite spinel; tempering; shaping; and thereafter burning the shaped mass.

4. The process of making a burned chromite refractory material from natural chrome ore, characterized by the presence therein of forsterite, which comprises associating in intimate admixture chrome ore and dead burnt crystallized magnesium oxide, the magnesium oxide being present in amounts greater than 12½% of the total weight of the mix, the amount employed being sufficient to convert substantially all the low melting point gangue into forsterite, but being insufficient to decompose the chromite spinel; tempering, shaping; and thereafter burning the shaped mass.

5. The process of making a burned chromite refractory material from natural chrome ore, characterized by the presence therein of forsterite, which comprises associating in intimate admixture chrome ore and dead burnt crystallized magnesium oxide, the magnesium oxide being present in amounts greater than 12½% of the total weight of the mix but insufficient to decompose the chromite spinel; tempering; shaping; and thereafter burning the shaped mass at a temperature higher than 3,000° F.

6. The process of making a burned chromite refractory material from natural chrome ore, characterized by the presence therein of forsterite, which comprises associating in intimate admixture chrome ore and dead burnt crystallized magnesium oxide, the magnesium oxide being present in amounts greater than 12½% of the total weight of the mix, the amount employed being sufficient to convert substantially all the low melting point gangue into forsterite, but being insufficient to decompose the chromite spinel; tempering; shaping; and thereafter burning the mass at a temperature higher than 3,000° F.

7. The process of making a burned chromite refractory material from natural chrome ore, characterized by the presence therein of forsterite, which comprises heat-treating chrome ore in the presence of dead burnt crystallized magnesium oxide to a temperature at least equal to the burning temperature of the refractory, the magnesium oxide being present in amounts greater than 12½% of the total weight of the mix, but insufficient to decompose the chromite spinel; grinding; tempering; shaping; and thereafter burning the shaped mass.

8. The process of making a burned chromite refractory material from natural chrome ore, characterized by the presence therein of forsterite, which comprises heat-treating chrome ore in the presence of dead burnt crystallized magnesium oxide of a temperature at least equal to the burning temperature of the refractory, the magnesium oxide being present in amounts greater than 12½%, the amount employed being sufficient to convert substantially all the low melting point gangue into forsterite, but insufficient to decompose the chromite spinel; grinding; tempering; shaping; and thereafter burning the shaped mass.

9. The process of making a burned chromite refractory material from natural chrome ore, characterized by the presence therein of forsterite, which comprises heat-treating chrome ore in the presence of dead burnt crystallized magnesium oxide at a temperature higher than 3,000° F., the magnesium oxide being present in amounts greater than 12½% of the total weight of the mix, but insufficient to decompose the chromite spinel; grinding; tempering; shaping;

and thereafter burning the shaped mass at a temperature higher than 3,000° F.

10. The process of making a burned chromite refractory material from natural chrome ore, characterized by the presence therein of forsterite, which comprises heat-treating chrome ore in the presence of dead burnt crystallized magnesium oxide at a temperature higher than 3,000° F., the magnesium oxide being present in amounts between 17% and 25% of the total weight of the mix, but insufficient to decompose the chromite spinel; grinding; tempering; shaping; and thereafter burning the shaped mass at a temperature higher than 3,000° F.

11. The process of making a burned chromite refractory material from natural chrome ore, characterized by the presence therein of forsterite, which comprises heat-treating chrome ore in the presence of dead burnt crystallized magnesium oxide to a temperature at least equal to the burning temperature of the refractory; grinding the mixture; subjecting the mixture to tempering in the presence of additional amounts of dead burnt magnesium oxide, the total amount of magnesium oxide associated with the ore being greater than 12½% of the total weight of the mix, but insufficient to decompose the chromite spinel; and thereafter shaping and burning the mass.

12. The process of making a burned chromite refractory material from natural chrome ore, characterized by the presence therein of forsterite, which comprises heat-treating chrome ore in the presence of dead burnt crystallized magnesium oxide to a temperature at least equal to the burning temperature of the refractory; grinding the mixture; subjecting the mixture to tempering in the presence of additional amounts of dead burnt magnesium oxide, the total amount of magnesium oxide associated with the ore being greater than 12½% of the total weight of the mix, the amount employed being sufficient to convert substantially all of the low melting point gangue into forsterite, but insufficient to decompose the chromite spinel; and thereafter shaping and burning the mass.

13. The process of making a burned chromite refractory material from natural chrome ore, characterized by the presence therein of forsterite, which comprises heat-treating chrome ore in the presence of dead burnt crystallized magnesium oxide at a temperature higher than 3,000° F.; grinding the mixture; subjecting the mixture to tempering in the presence of additional amount of dead burnt magnesium oxide, the total amount of magnesium oxide associated with the ore being greater than 12½% of the total weight of the mix, but insufficient to decompose the chromite spinel, and burning the mass at a temperature higher than 3,000° F.

14. The process of making a burned chromite refractory material from natural chrome ore, characterized by the presence therein of forsterite, which comprises heat-treating chrome ore in the presence of dead burnt crystallized magnesium oxide at a temperature higher than 3,000° F.; grinding the mixture; subjecting the mixture to tempering in the presence of additional amounts of dead burnt magnesium oxide, the total amount of additional amounts of dead burnt magnesium oxide, the total amount of magnesium oxide associated with the ore being between 17% and 25% of the total weight of the mix, but insufficient to decompose the chromite spinel, and thereafter shaping, and burning the mass at a temperature higher than 3,000° F.

15. The process of making a burned chromite refractory material from natural chrome ore, characterized by the presence therein of forsterite, which comprises subjecting chrome ore to a heat-treatment at a temperature at least equal to the burning temperature of the refractory; grinding the heat-treated ore; tempering said ore in the presence of dead burnt crystallized magnesium oxide, the magnesium oxide being present in amounts greater than 12½% of the total weight of the mix, but insufficient to decompose the chromite spinel; and thereafter shaping and burning the mass.

16. The process of making a burned chromite refractory material from natural chrome ore, characterized by the presence therein of forsterite, which comprises subjecting chrome ore to a heat-treatment at a temperature at least equal to the burning temperature of the refractory; grinding the heat-treated ore; tempering said ore in the presence of dead burnt crystallized magnesium oxide, the magnesium oxide being present in amounts greater than 12½% of the total weight of the mix, the amount employed being sufficient to convert substantially all of the low melting point gangue into forsterite, but insufficient to decompose the chromite spinel; and thereafter shaping and burning the mass.

17. The process of making a burned chromite refractory material from natural chrome ore, characterized by the presence therein of forsterite, which comprises subjecting the chrome ore to heat-treatment at a temperature higher than 3,000° F.; grinding the heat-treated ore; tempering said ore in the presence of dead burnt crystallized magnesium oxide, the magnesium oxide being present in amounts higher than 12½% of the total weight of the mix, but insufficient to decompose the chromite spinel; and thereafter shaping, and burning the mass at a temperature higher than 3,000° F.

18. The process of making a burned chromite refractory material from natural chrome ore, characterized by the presence therein of forsterite, which comprises subjecting the chrome ore to a heat-treatment at a temperature higher than 3,000° F.; grinding the heat-treated ore; tempering said ore in the presence of dead burnt crystallized magnesium oxide, the magnesium oxide being present in amounts between 17% and 25% of the total weight of the mix, but insufficient to decompose the chromite spinel; and thereafter shaping, and burning the mass at a temperature higher than 3,000° F.

GILBERT E. SEIL.